United States Patent
Kelm et al.

(10) Patent No.: US 11,575,733 B2
(45) Date of Patent: *Feb. 7, 2023

(54) SYSTEM AND METHOD FOR DETERMINING AN INTEREST IN PROMOTIONAL CONTENT DISPLAYED AT A MOBILE COMMUNICATION DEVICE

(71) Applicant: Google LLC, Mountain View, CA (US)

(72) Inventors: James S. Kelm, Mountain View, CA (US); Thompson Alexander Ivor Gawley, Palo Alto, CA (US); Yelena Nakhimovsky, San Francisco, CA (US); Jonathan Yu, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/148,104

(22) Filed: Jan. 13, 2021

(65) Prior Publication Data
US 2021/0136139 A1  May 6, 2021

Related U.S. Application Data

(63) Continuation of application No. 16/292,937, filed on Mar. 5, 2019, now Pat. No. 11,102,275, which is a
(Continued)

(51) Int. Cl.
*G06F 3/048* (2013.01)
*H04L 67/10* (2022.01)
(Continued)

(52) U.S. Cl.
CPC ............ *H04L 67/10* (2013.01); *G06F 3/0481* (2013.01); *G06F 3/0484* (2013.01);
(Continued)

(58) Field of Classification Search
None
See application file for complete search history.

(56) References Cited

U.S. PATENT DOCUMENTS

| 5,914,716 A | 6/1999 | Rubin et al. |
|---|---|---|
| 6,133,918 A | 10/2000 | Conrad et al. |
| (Continued) | | |

OTHER PUBLICATIONS

Notice of Allowance for U.S. Appl. No. 16/292,937 dated Apr. 30, 2021 (7 pages).
(Continued)

*Primary Examiner* — Thanh T Vu
(74) *Attorney, Agent, or Firm* — Marshall, Gerstein & Borun LLP

(57) ABSTRACT

Determining interest in promotional content to be displayed at a mobile communication device is described. The promotional content, including a first portion that is visible and a second portion that is hidden in a first state, may be received. The first and second portions are each selectable only when visible. A promotional display that includes the promotional content in the first state is generated. Upon receipt of a first input from the user in relation to the first portion, the promotional content may be transitioned from the first state to a second state such the first portion becomes hidden and the second portion becomes visible. Upon failing to receive a second input from the user in relation to the second portion, the promotional content may be transitioned from the second state to the first state. Upon receipt of the second input, an interest in the promotional content may be indicated.

20 Claims, 8 Drawing Sheets

Related U.S. Application Data continuation of application No. 14/919,295, filed on Oct. 21, 2015, now Pat. No. 10,326,827, which is a continuation of application No. 12/883,479, filed on Sep. 16, 2010, now Pat. No. 9,170,705.

(60) Provisional application No. 61/334,503, filed on May 13, 2010.

(51) Int. Cl.
*G06F 3/0481* (2022.01)
*G06Q 30/02* (2012.01)
*H04L 67/01* (2022.01)
*G06F 16/957* (2019.01)
*G06F 3/0484* (2022.01)

(52) U.S. Cl.
CPC ..... *G06F 16/9577* (2019.01); *G06Q 30/0256* (2013.01); *G06Q 30/0267* (2013.01); *G06Q 30/0277* (2013.01); *H04L 67/01* (2022.05)

(56) References Cited

U.S. PATENT DOCUMENTS

| | | | |
|---|---|---|---|
| 8,434,003 B2 | 4/2013 | Zalewski et al. | |
| 8,547,348 B2 | 10/2013 | Jonsdottir | |
| 8,935,243 B2 | 1/2015 | Marshall | |
| 2002/0103698 A1* | 8/2002 | Cantrell | G06Q 30/0257 705/14.55 |
| 2002/0120505 A1 | 8/2002 | Henkin et al. | |
| 2005/0096980 A1* | 5/2005 | Koningstein | G06Q 30/00 705/14.41 |
| 2006/0231612 A1 | 10/2006 | Walker et al. | |
| 2007/0050252 A1 | 3/2007 | Jain | |
| 2007/0150826 A1 | 6/2007 | Anzures et al. | |
| 2007/0042760 A1 | 8/2007 | Roth | |
| 2008/0215428 A1 | 9/2008 | Ramer et al. | |
| 2009/0007017 A1 | 1/2009 | Anzures et al. | |
| 2009/0177538 A1* | 7/2009 | Brewer | G06Q 30/02 705/14.54 |
| 2009/0225037 A1 | 9/2009 | Williamson et al. | |
| 2009/0289916 A1 | 11/2009 | Dai | |
| 2010/0023398 A1 | 1/2010 | Brown et al. | |
| 2010/0114706 A1 | 5/2010 | Kosuru | |
| 2010/0146412 A1 | 6/2010 | Nagase | |
| 2010/0159995 A1 | 6/2010 | Stallings et al. | |
| 2010/0198697 A1 | 8/2010 | Brown et al. | |
| 2010/0205036 A1 | 8/2010 | Van Der Haar et al. | |
| 2011/0078030 A1 | 3/2011 | Borst et al. | |
| 2011/0082754 A1* | 4/2011 | Shuster | G06Q 30/0253 705/14.68 |
| 2011/0099076 A1 | 4/2011 | Repas | |
| 2011/0161790 A1 | 6/2011 | Junior et al. | |
| 2011/0213655 A1 | 9/2011 | Henkin et al. | |

OTHER PUBLICATIONS

Final Office Action for U.S. Appl. No. 12/883,479 dated Feb. 26, 2015 (27 pages).
Final Office Action for U.S. Appl. No. 12/883,479 dated May 20, 2013 (32 pages).
Final Office Action for U.S. Appl. No. 14/919,295 dated Mar. 16, 2018 (11 pages).
Final Office Action for U.S. Appl. No. 16/292,937 dated Sep. 21, 2020 (10 pages).
Non-Final Office Action for U.S. Appl. No. 12/883,479 dated Jul. 7, 2014 (33 pages).
Non-Final Office Action for U.S. Appl. No. 12/883,479 dated Nov. 7, 2012 (20 pages).
Non-Final Office Action for U.S. Appl. No. 14/919,295 dated Sep. 11, 2018 (12 pages).
Non-Final Office Action for U.S. Appl. No. 14/919,295 dated Sep. 8, 2017 (9 pages).
Non-Final Office Action for U.S. Appl. No. 16/292,937 dated Mar. 18, 2020 (11 pages).
Notice of Allowance for U.S. Appl. No. 12/883,479 dated Jul. 6, 2015 (9 pages).
Notice of Allowance for U.S. Appl. No. 14/919,295 dated Feb. 6, 2019 (7 pages).
Notice of Allowance for U.S. Appl. No. 16/292,937 dated Jan. 22, 2021 (8 pages).

* cited by examiner

SYSTEM AND METHOD FOR DETERMINING AN INTEREST IN PROMOTIONAL CONTENT DISPLAYED AT A MOBILE COMMUNICATION DEVICE

CROSS-REFERENCE TO RELATED PATENT APPLICATIONS

The present application is a continuation of and claims priority to U.S. application Ser. No. 16/292,937, filed Mar. 5, 2019, entitled "SYSTEM AND METHOD FOR DETERMINING AN INTEREST IN PROMOTIONAL CONTENT DISPLAYED AT A MOBILE COMMUNICATION DEVICE", which itself is a continuation of and claims priority to U.S. application Ser. No. 14/919,295, filed Oct. 21, 2015, entitled "SYSTEM AND METHOD FOR DETERMINING AN INTEREST IN PROMOTIONAL CONTENT DISPLAYED AT A MOBILE COMMUNICATION DEVICE", which itself is a continuation of and claims priority to U.S. application Ser. No. 12/883,479, filed Sep. 16, 2010, entitled "SYSTEM AND METHOD FOR DETERMINING AN INTEREST IN PROMOTIONAL CONTENT DISPLAYED AT A MOBILE COMMUNICATION DEVICE", which itself claims priority to U.S. Provisional Patent Application Ser. No. 61/334,503, filed May 13, 2010, entitled "SYSTEM AND METHOD FOR DETERMINING AN INTEREST IN PROMOTIONAL CONTENT DISPLAYED AT A MOBILE COMMUNICATION DEVICE", the contents of each of which are incorporated herein by reference in their entirety.

FIELD OF THE INVENTION

The disclosure relates to communicating promotional content to mobile communication devices and more particularly to determining an interest in promotional content displayed at a mobile communication device.

BACKGROUND OF THE INVENTION

The present invention relates generally to the field of being portable, generally compact, and oftentimes including touch-sensitive input mechanisms (such as touch screens), mobile communication devices may be prone to inadvertent user inputs such as clicks in relation to a user interface being displayed at the mobile communication device.

This may be problematic because accidentally clicking on a display object such as a link, image, or other object may cause false positive indications of interest in promotional content displayed at the mobile communication device. Marketers that generate the promotional content (such as businesses wishing to promote goods and/or services) as well as providers of the promotional content (such as entities having advertising networks and other outlets for placing advertisements on behalf of marketers) often wish to track interest in the promotional content for advertising purchase/sales accounting. Furthermore, providers of the promotional content wish to analyze interest in the promotional content in order to assess whether appropriate audiences are being targeted for particular products and/or services. However, receiving false indications of interest in promotional content through inadvertent inputs by operators of mobile communication devices may skew such analyses.

Another problem resulting from inadvertent user inputs of promotional content includes causing the mobile communication device to interrupt one process in favor of another process. For instance, while navigating a website using a mobile device having a touch screen, an operator of the mobile device may accidentally select a link from promotional content such as an advertisement placed within the website. The inadvertent click may cause the browser of the mobile device to open a marketing website associated with the link from the advertisement. Thus, the browser process (displaying the website originally navigated) is interrupted in favor of the advertisement. This may cause frustration to the operator of the mobile device.

Thus, inadvertent inputs in relation to promotional content displayed at a mobile communication device may interrupt processes occurring at the mobile device as well as create false positive indications of interest in the promotional content. What is needed are improved systems and methods for determining an interest in promotional content displayed at mobile communication devices. These and other problems exist.

SUMMARY OF THE INVENTION

One embodiment of the invention relates to various systems, computer program products, and methods for providing determining an interest in promotional content displayed at a mobile communication device are described herein.

According to various implementations of the invention, promotional content such as advertisements, coupons, or other marketing materials may be designed by a seller of goods and/or services. The seller may, for example, provide first and second portions of promotional content. A processing system may determine different portions to be displayed according to different states of the promotional content. In some implementations, the processing system may generate promotional content that includes display content in the first state, display content in the second state, and an input (such as a landing page link) associated with the second state that when selected causes an action to be performed in relation to the promotional content. In some implementations, the promotional content may be stored in one or more content servers.

In some implementations, the processing system may receive a request such as search terms of a web search engine from the mobile communication device. In response to the request, the processing system may identify and/or generate promotional content to be displayed at the mobile communication device. In other words, the processing system may target different mobile communication devices with different promotional content.

In some implementations, the mobile communication device may receive the promotional content and display the promotional content within a promotional display. In some implementations, the promotional content is displayed to the user in a first state where a first portion of promotional content is visible and a second portion of promotional content is hidden. The first portion and the second portion is selectable only when visible. Thus, when the promotional content is displayed in the first state, only the first portion is selectable while the second portion is not selectable. Likewise, when the promotional content is displayed in the second state, only the second portion is selectable while the first portion is not selectable.

In some implementations, upon receipt of a first input in relation to the first portion of promotional content in the first state, the promotional content transitions to a second state where the first portion becomes hidden and the second portion becomes visible. Thus, when the promotional content is displayed in the second state, only the second portion is selectable while the first portion is not selectable.

In some implementations, upon receipt of a second input in relation to the second portion (such as when the user clicks promotional content in the second state), an interest in the promotional content may be indicated. In some implementations, the mobile communication device may display other content such as a website related to the promotional content. In some implementations, the mobile communication device may indicate the interest to the processing server after receipt of the second user input. In other words, by actually selecting the promotional content twice, the user is indicating an actual interest in the promotional content and indications of interest resulting from inadvertent selections (such as single selections) can be avoided.

In some implementation, when the second input is not received, the promotional content may transition from the second state to the first state. In some implementations, the transition from the second state to the first state occurs without user intervention (such as a timeout being exceeded). In some implementations, the second state may include a "close" button or other input member that causes the promotional content to transition to the first state. In some implementations, a user input not related to the promotional content may be received that causes the transition from the second state to the first state.

In some implementations, the promotional content may occupy a fixed area within the display whether the promotional content is in the first state or the second state. In other words, the first state of promotional content may occupy substantially the same space within the display as the second state of promotional content. In this manner, extra screen space may not be needed to display either the first portion of promotion content or the second portion of promotional content.

In some implementations, the first portion may include scent of information that indicates a progression that will occur when the first input in relation to the promotional content is received. In other words, the first portion may indicate or otherwise suggest content that will be displayed after the user selects the first portion.

According to various implementations of the invention, because interest may be indicated after the second input and not after the first input, false positive indications of interest in the promotional content caused by inadvertent inputs by the user may be reduced. Furthermore, because the transitions from one state to another state may occur without launching or otherwise causing another application or process to be altered (apart from the transition of the promotional content itself), interrupted processes at the mobile communication device caused by inadvertent inputs related to the promotional content may be reduced. For example, the generated promotional content may include transition instructions that cause transition from one state to another state. The transition instructions may include, but is not limited to, scripting languages such as JAVASCRIPT, native instructions such as HTML5, or other instructions that do not require interrupting a process or application executing at the mobile communication device.

In some implementations, a slider ad that slides to reveal different portions of the promotional content may be generated. For example, the slider ad may display the first portion while hiding the second portion. When the first user input is received in relation to the first portion, the promotional content may transition to the second state in a sliding action so that the first portion becomes hidden as the second portion becomes visible. In the second state, a call-to-action or other selection input mechanism may be displayed that when selected indicates an interest in the promotional content, thereby capturing user interest in the promotional content after the second user input but not after the first user input.

DETAILED DESCRIPTION OF THE INVENTION

Figure 1:
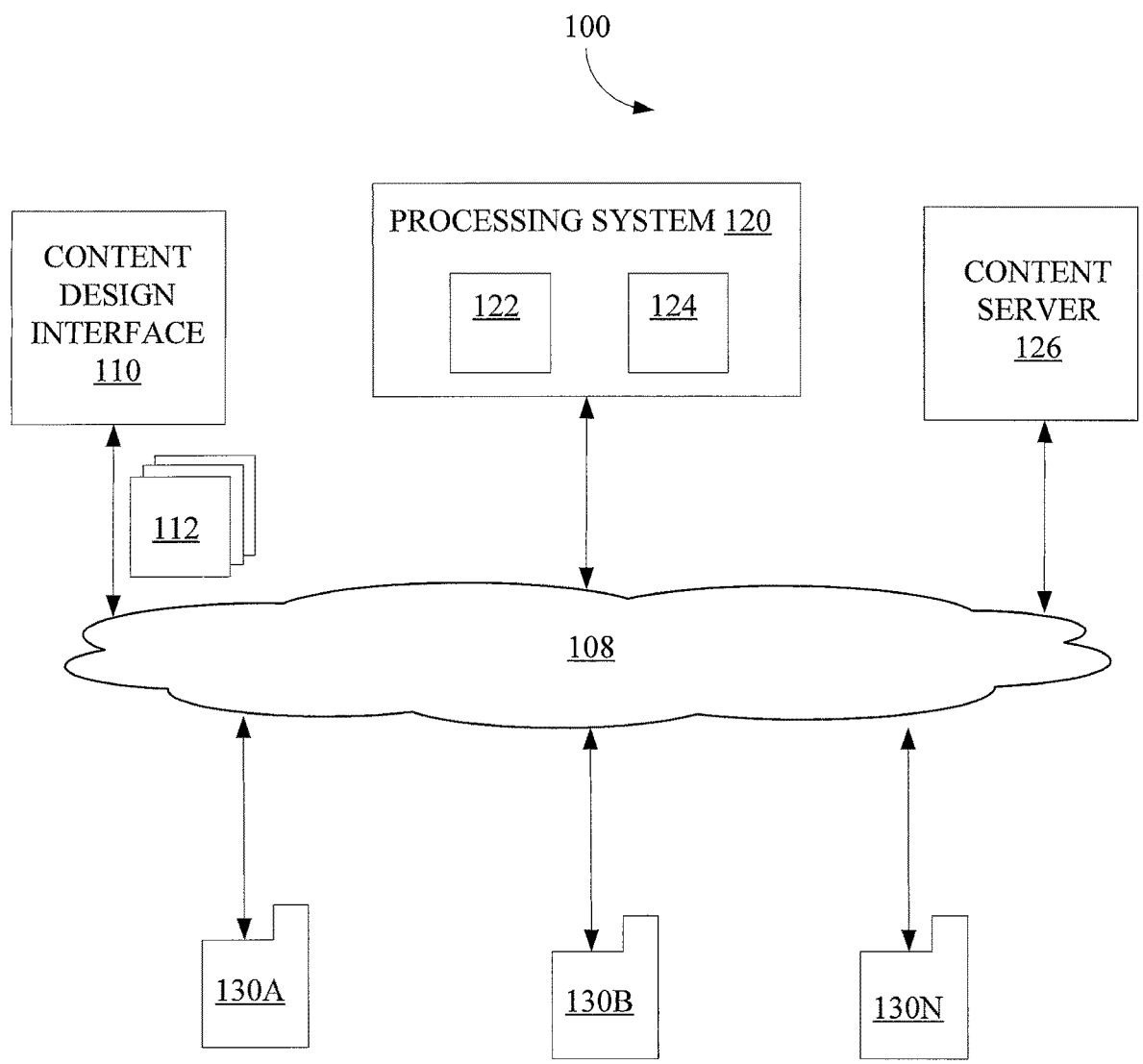
FIG. 1 is a block diagram illustrating a system for determining an interest in promotional content displayed at a mobile communication device, according to various implementations of the invention.

FIG. 1 is a block diagram illustrating a system 100 for determining an interest in promotional content 112 displayed at a mobile communication device 130, according to various implementations of the invention. Promotional content 112 may include, for example, an advertisement, a coupon, and/or other marketing content. Promotional content 112 may include various types of formats such as text, image, video, audio, other formats suitable to convey promotional content 112, and/or any combination of formats. In some implementations, promotional content 112 may be configured to exist in different states. For example, a first state of promotional content 112 may display information that describes the subject matter of an advertisement. User input (whether intentional or not) related to promotional content 112 displayed to the user in the first state causes promotional content 112 to be transitioned to a second state. The second state of promotional content 112 may include inputs such as a call-to-action that when selected causes further actions such as a website of the advertiser to be displayed. In this manner, apart from transitioning from the first state to the second state, accidental selection of promotional content 112 when displayed in the first state may not interrupt or otherwise cause further actions at mobile communication device 130.

In some implementations, whether in the first state or the second state, promotional content 112 may be displayed within a predefined area of space. In other words, the first state of promotional content 112 may occupy the same amount of space as the second state of promotional content 112. In some implementations, the transition from the first state to the second state occurs in sliding fashion such that promotional content 112 in the first state becomes hidden as promotional content 112 in the second state becomes visible in a sliding manner.

In some implementations, depending on the state of promotional content 112, an interest in promotional content 112 may be determined. For example, a first input from the user in relation to promotional content 112 in the first state may cause promotional content 112 to transition from the first state to the second state but not indicate user interest in promotional content 112. Based on a second input from the user in relation to promotional content 112 in the second state, user interest in promotional content 112 may be ascertained. "Input from the user" (including the "first input form the user," "second input from the user" and "user input") in relation to promotional content 112 includes an indication that the user has selected promotional content 112 by clicking with a finger, a stylus, or other object; shaking or tapping mobile communication device 130; uttering a verbal command; and/or taking any other action in relation to mobile communication device 130 to indicate a selection. Unless otherwise indicated, "input from the user," "clicking," "shaking," "tapping," "uttering," and taking other action in relation to mobile communication device 130 and/or promotional content 112 are used interchangeably herein throughout. The foregoing example inputs from the user may be intentional or inadvertent/otherwise unintentional. Thus, in some implementations, promotional content 112 may be designed so that a user input related to the first state does not definitively indicate interest in promotional content 112 while a second user input related to the second state does definitively indicate interest in promotional content 112. In this manner, unintentional or inadvertent inputs related to promotional content 112 that indicate interest in promotional content 112 may be reduced.

Mobile communication device 130 may include a mobile device such as a cellular telephone, a personal digital assistant, a tablet computing device, and/or other mobile communication device on which promotional content 112 can be displayed. However, as would be appreciated, instead of or in addition to mobile communication device 130, various functions described herein may be applied to other devices such as a desktop computer or other computing devices that are not necessarily portable.

According to various implementations of the invention, system 100 may include a content design interface 110, a processing system 120, a content server 126, mobile communication device 130 (illustrated in FIG. 1 as mobile communication devices 130A, 130B, 130N), and/or other components. In some implementations, content design interface 110, processing system 120, content server 126, and mobile communication device 130 may be coupled to one another via network 108. Network 108 may include a Local Area Network, a Wide Area Network, a cellular communications network, a Public Switched Telephone Network, and/or other network or combination of networks.

In some implementations, processing system 120 may generate and/or be coupled to content design interface 110.

In some implementations, content design interface 110 executes on a client computing device (not illustrated in FIG. 1). For example, content design interface 110 may include a website displayed on a web browser executing at the client computing device, a user interface application executing on the client computing device, and/or other interface configured to receive input from a user.

In some implementations, content design interface 110 enables a promoter such as an advertiser or other entity wishing to promote products and/or services to input or otherwise design promotional content 112 for display at mobile communication device 130. For example, content design interface 110 may include input elements that enable the promoter to input promotional content 112 in order to design advertisements displayed on mobile devices. The input elements may be text input areas, file upload interfaces, checkboxes, and/or other input elements.

In some implementations, content design interface 110 includes one or more first input elements configured to receive the first portion of promotional content 112, one or more second input elements configured to receive the second portion of promotional content 112, other input elements configured to receive other portions of promotional content 112, and/or other input elements. For example, content design interface 110 may provide input elements specifically for different portions of promotional content 112, thereby allowing the promoter to indicate which portions of promotional content 112 are to be displayed during different states.

In some implementations, the input elements of content design interface 110 may be used to specify metadata associated with promotional content 112. In these implementations, the metadata may indicate a state of promotional content 112. For example, the promoter may explicitly indicate a first portion of promotional content 112 to be displayed while in the first state and a second portion of promotional content 112 to be displayed while in the second state. Other portions or combination of portions and states may be indicated as would be appreciated. In this manner, through content design interface 110, the promoter may explicitly indicate what is displayed when promotional content 112 is in different states.

According to various implementations of the invention, processing system 120 may receive the first portion of promotional content 112 and the second portion of promotional content 112 from content design interface 110. In some implementations, processing system 120 may generate promotional content 112 based on the first portion and the second portion. In some implementations, processing system 120 may determine different states of promotional content 112. In other words, processing system 120 may determine which portions of promotional content 112 is to be displayed during different states of promotional content 112. In some implementations, processing system 120 may generate promotional content 112 that includes display content for the first state and display content for the second state. The "display content" includes content such as, but not limited to, the first portion, the second portion, format and/or operational instructions for displaying the first portion and the second portion. The display content may cause promotional content 112 to be displayed according to different states via a promotional display at mobile communication device 130. For example, in some implementations, the display content for the first portion may include content that causes mobile communication device 130 to display promotional content 112 in the first state. Likewise, the display content for the second portion may include content that causes mobile communication device 130 to display promotional content 112 in the second state.

In some implementations, the generated promotional content 112 may include an input associated with the second state. For example, the input may include, but is not limited to, a landing page link such as a uniform resource locator link to an advertiser's website and/or other input that when selected causes additional processes to be executed in relation to promotional content 112.

In some implementations, the generated promotional content 112 may include one or more transition instructions that cause promotional content 112 to transition from one state to another state. For example, when executed the transition instructions may cause display content for the first state to transition to display content for the second state. The transition instructions may include, but is not limited to, JAVASCRIPT, HTML5, and/or other instructions that cause display content to transition from one state to another state.

In some implementations, processing system 120 may be coupled to or include content server 126. Processing system 120 may communicate the generated promotional content 112 to content server 126 for storage and/or later retrieval. Although illustrated in FIG. 1 as a single server, content server 126 may include a plurality of content servers as would be appreciated.

In some implementations, different portions of promotional content 112 includes metadata or other indications that identify different portions of promotional content 112 to be displayed during different states. In other words, when received from content design interface 110, promotional content 112 includes one or more indications that a first portion of promotional content 112 is to be displayed during the first state and a second portion of promotional content 112 is to be displayed during the second state.

In other implementations, processing system 120 may determine different states of promotional content 112. In other words, processing system 120 may determine which portions of promotional content 112 is to be displayed during different states of promotional content 112 without these indications. For example, processing system 120 may decide which portions of promotional content 112 to display during the first, second, and/or other states of promotional content 112 even when the promoter via content design interface 110 has not identified different portions of promotional content 112. In some implementations, the decision may be based on different types for different portions of promotional content 112. For example, a portion of promotional content 112 may include text while another portion of promotional content 112 may include hyperlinks to a website. Processing system 120 may decide to cause text portions of promotional content 112 to be displayed during the first state and hyperlink portions of promotional content 112 to be displayed during the second state.

According to various implementations of the invention, processing system 120 may receive a request from mobile communication device 130. The request may be related to one or more query terms for a search, an email, a gaming application, a website, and/or other request. Based on the request, processing system 120 may identify promotional content 112 to be displayed at mobile communication device 130.

In some implementations, processing system 120 may determine whether promotional content 112 is to be displayed according to different states. In some implementations, this determination is made based on whether promotional content 112 indicates other otherwise includes metadata that indicates different portions of promotional content 112 is to be displayed based on different states.

In some implementations, this determination is made based on a type of mobile communication device 130 where promotional content 112 is to be displayed. For example, because mobile devices having touch screens may be more prone to accidental user inputs such as clicks, processing system 120 may determine that promotional content 112 is to be displayed according to different states based on the type of device where promotional content 112 is to be displayed.

In some implementations, processing system 120 may communicate promotional content 112 and/or instructions for displaying promotional content 112 to mobile communication device 130, where promotional content 112 is displayed and an interest in promotional content 112 is determined based on different states of promotional content 112.

In some implementations, processing system 120 may receive an indication of interest in promotional content 112 from mobile communication device 130. For example, upon receipt of a second input related to a second portion of promotional content 112 displayed when in the second state, mobile communication device 130 may indicate an interest by the operator in promotional content 112. Processing system 120 may process the indication of interest according to known techniques to accurately charge advertisers, refine identification of suitable promotional content, and/or perform other analysis related to interest in promotional content.

According to various implementations of the invention, processing system 120 may include a processor 122, a memory 124, and/or other components that facilitate the functions of processing system 120 described herein. In some implementations, processor 122 includes one or more processors configured to perform various functions of processing system 120. In some implementations, memory 124 includes one or more tangible (i.e., non-transitory) and/or transitory computer readable media. Memory 124 may include one or more instructions that when executed by processor 122 configures processor 122 to perform the functions of processing system 120. In some implementations, memory 124 includes one or instructions stored on tangible computer readable media that when executed at a remote device, such as mobile communication device 130, cause the remote device to display promotional content 112 as described herein. In other words, memory 124 may include instructions that cause functional operations of the different states of promotional content 112 to be executed at mobile communication device 130.

Figure 2:
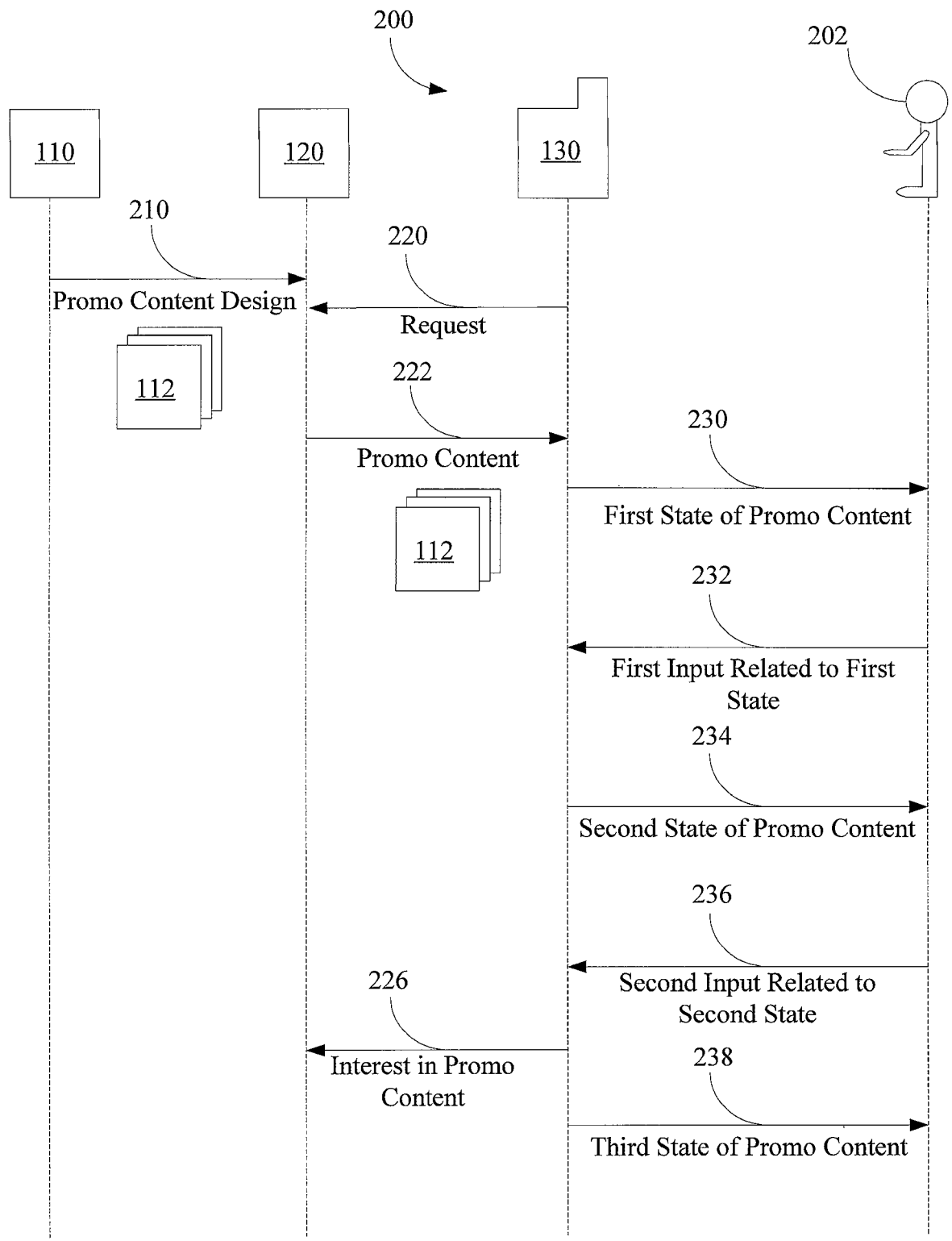
FIG. 2 is a data flow diagram illustrating process relationships in a system for determining an interest in promotional content displayed at a mobile communication device, according to various implementations of the invention.

FIG. 2 is a data flow diagram 200 illustrating process relationships in system 100 for determining an interest in promotional content 112 displayed at mobile communication device 130, according to various implementations of the invention. The various processing operations and/or data flows depicted in FIG. 2 (and in the other drawing figures) are described in greater detail herein. The described operations for a flow diagram may be accomplished using some or all of the system components described in detail above and, in some implementations, various operations may be performed in different sequences. According to various implementations of the invention, additional operations may be performed along with some or all of the operations shown in the depicted flow diagrams. In yet other implementations, one or more operations may be performed simultaneously. Accordingly, the operations as illustrated (and described in greater detail below) are examples by nature and, as such, should not be viewed as limiting.

According to various implementations of the invention, in an operation 210, promotional content 112 may be designed at content design interface 110 in order to promote goods and/or services. For example, using content design interface 110, a user such as an advertiser may design or otherwise input content in various formats in order to design promotional content 112 to be displayed at mobile communication device 130. The various formats may include text, image, video, audio, and/or other format suitable to be displayed at an end user device such as mobile communication device 130.

In some implementations, the user of content design interface 110 may identify different portions of promotional content 112 that is "activated" (i.e., made selectable) according to different states. For example, the user may specify that a first portion of promotional content 112 is to be active in a first state while a second portion of promotional content 112 is to be inactive in the first state. The user may specify that the first portion is to be inactive in a second state and the second portion is to be active in the second state. In this manner, a recipient of promotional content 112 may select the first portion while being unable to select the second portion when promotional content 112 is in the first state and may select the second portion while being unable to select the first portion when promotional content 112 is in the second state.

Processing system 120 may receive different portions of promotional content 112 designed using content design interface 110. In some implementations, processing system 120 may generate promotional content 112 based on the received portions. In some implementations, processing system 120 may store promotional content 112 for retrieval at an appropriate time. In some implementations, processing system 120 stores promotional content 112 using one or content servers such as content server 126, which is coupled to or is included in processing system 120.

In an operation 220, processing system 120 may receive a request from mobile communication device 130. The request may be related to an application or other process executing at mobile communication device 130. In some implementations, the request includes one or more search terms from an operator 202 of mobile communication device 130 entered into a search engine. The search engine may be a web-based search engine and/or a search engine that searches a hard drive or other component of mobile communication device 130. In some implementations, the request is related to an application such as a gaming or other application being displayed at mobile communication device 130. For example, the request may include a login to an online gaming application accessed using mobile communication device 130. In some implementations, the request may include location information that indicates a geographic location of mobile communication device 130. Other types of requests related to applications and/or processes executing at mobile communication device 130 may be received by processing system 120 as would be appreciated.

In an operation 222, promotional content 112 to be delivered to mobile communication device 130 is identified and/or generated as described above with respect to FIG. 1. In some implementations, the identification is based on the request from mobile communication device 130. For example, processing system 120 may identify promotional content 112 related to: search terms entered by the operator of mobile communication device 130 (such as florist advertisements when the user searches for "online flowers"; a gaming application being played by operator 202 (such as promotional content related to other gaming applications or upgrades to the gaming application being played); the location of mobile communication device 130 (such as advertisements from retailers within walking distance of mobile communication device 130); and/or other content related to the request from mobile communication device 130.

In operation 222, processing system 120 may communicate promotional content 112 to mobile communication device 130. Promotional content 112 may be communicated to mobile communication device 130 in the form of instructions or other data that is processed at mobile communication device 130 to display promotional content 112.

In some implementations, promotional content 112 is in a native format that is particular to an operating system of mobile communication device 130 such as a form space included with the operating system. For example, processing system 120 may generate promotional content 112 in a format that uses operating system objects in a form space of mobile communication device 130 so that promotional content 112 has a "look-and-feel" of graphical objects from the particular operating system.

In some implementations, the display content for promotional content 112 (in various states) is in a format such as HTML that is generalized to be processed by different types of devices. For example, the HTML may be included within a webpage being viewed using mobile communication device 130. The webpage may include reserved portions for advertisements or other promotions so that when displayed the webpage includes the display content for promotional content 112 in HTML (or other format) from processing system 120. In some implementations, the transition instructions include commands such as JAVASCRIPT that cause promotional content 112 to transition from one state to another state without otherwise altering processes at mobile communication device 130. In some implementations, the transition instructions include open standards of dynamic content such as HTML5 so that proprietary formats are unnecessary to transition promotional content 112 from one state to another state without otherwise altering processes at mobile communication device 130.

Upon receipt of promotional content 112 (i.e., display content for the first state and display content for the second state), mobile communication device 130 may display promotional content 112 according to different states in an operation 230. The initial display of promotional content 112 may be defaulted to a particular state or be indicated to start at a particular state. For example, when initially displaying promotional content 112 in operation 230, mobile communication device 130 may do so by displaying the first state by default unless otherwise indicated by processing system 120. In some implementations, when displayed in the first state, a first portion of promotional content 112 may be selected by operator 202 while the second portion of promotional content 112 may not be selected by operator 202.

In an operation 232, mobile communication device 130 may receive a first input related to the first portion when promotional content 112 is in the first state. For example, operator 202 may have selected the first portion of promotional content 112 by clicking or otherwise indicating selection of the first portion using mobile communication device 130. The first input related to the first portion may include a selection such as a click, shake or other movement of mobile communication device 112, verbal command and/or other indication that indicates an interest in the first portion.

In some implementations, the first input causes mobile communication device 130 to transition promotional content 112 to the second state. Accordingly, in an operation 234, mobile communication device 130 may display promotional content 112 in the second state. For example, the first input related to the first portion by operator 202 transitions promotional content 112 to the second state thereby activating the second portion so that the second portion may become selectable.

In an operation 236, mobile communication device 130 may receive a second input related to the second portion when promotional content 112 is in the second state. Similar to the first input as described above, the second input may be a selection or other indication of an interest in the second portion.

In some implementations, upon receipt of the second input related to the second portion, mobile communication device 130 indicates an interest in promotional content 112. In some implementations, mobile communication device 130 may communicate the interest to processing server 120 in an operation 226 so that processing server 120 may process or otherwise store the indication of interest.

In some implementations, in an operation 238, mobile communication device 130 displays a third state of promotional content 112. The third state may include a display of additional portions of promotional content 112 or other information or action related to promotional content 112.

In some implementations, the third state of promotional content 112 may not display portions of promotional content 112. For example, the third state of promotional content 112 may include causing mobile communication device 130 to perform an action other than displaying portions of promotional content 112 such as open a new window to an advertiser's web site.

In some implementations (not illustrated in FIG. 2), a second input is not received by mobile communication device 130. In these implementations, operator 202 may have accidentally entered the first input, may have intentionally entered the first input but is not interested in promotional content 112 after viewing the second portion, or otherwise is not interested in entering the second input to proceed further with promotional content 112. In some implementations, promotional content 112 may transition from the second state to the first state. In some implementations, the transition from the second state to the first state occurs without user intervention such as, but not limited to, via a timeout function. In some implementations, the transition from the second state back to the first state occurs with user intervention such as selection of, by operator 202, a "close" button or other input object displayed in association with the second state, a user input at mobile communication device 130 unrelated to promotional content 112, and/or other actions by operator 202 that indicates no further interest in promotional content 112.

Although described in FIG. 2 as communicating promotional content 112 in response to a request, promotional content 112 may be communicated to mobile communication device 130 at different times to be stored at mobile communication device 130 for display at appropriate times. For example, various types and/or numbers of promotional content 112 may be communicated to mobile communication device 130, which may store promotional content 112 for display at a later time. In this instance, mobile communication device 130 may determine whether and/or when to retrieve promotional content 112 stored locally (at mobile communication device 130) as would be appreciated.

Figure 3:
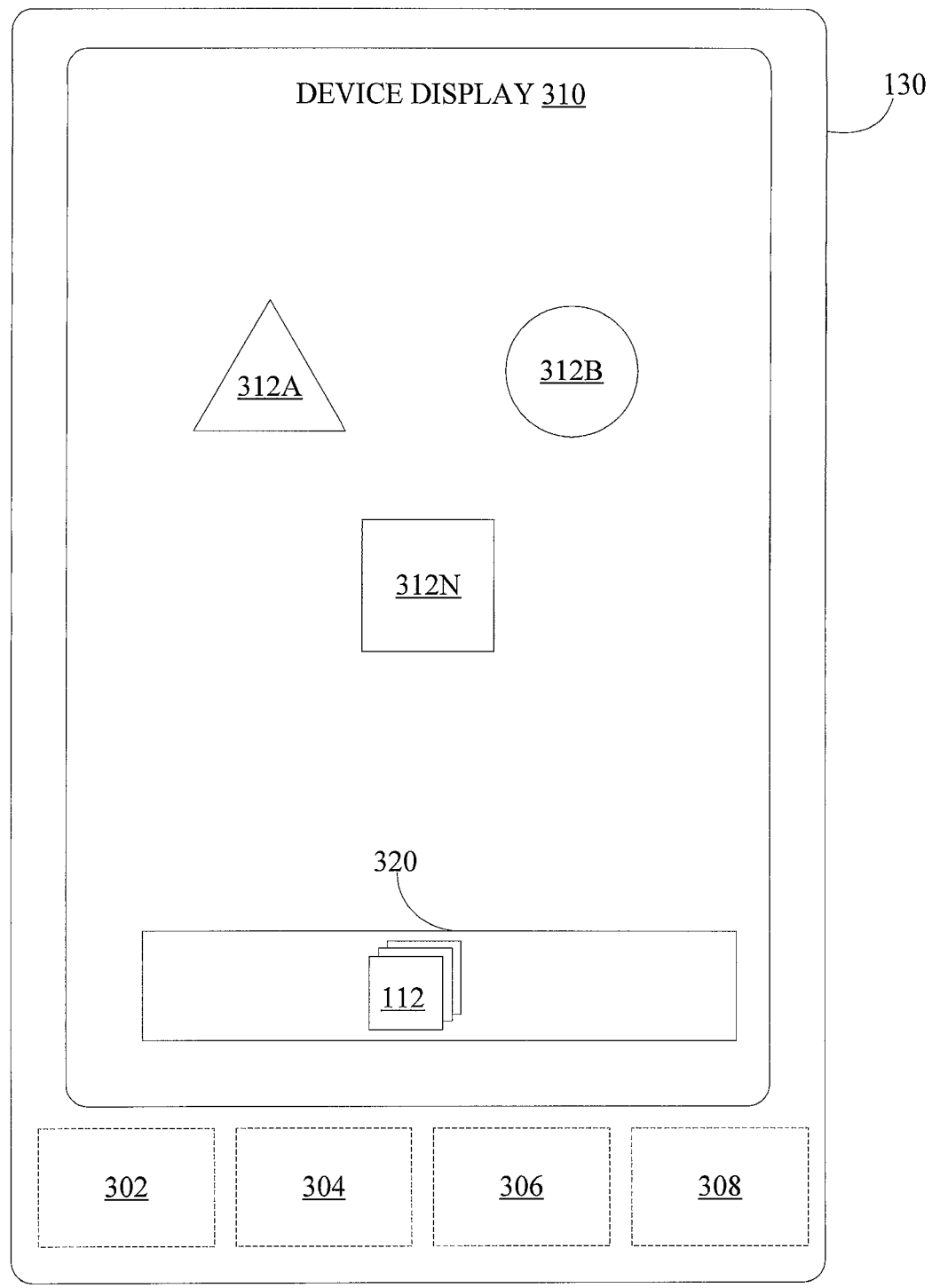
FIG. 3 is a block diagram illustrating promotional content being displayed at a mobile communication device, according to various implementations of the invention.

FIG. 3 is a block diagram illustrating promotional content 112 being displayed at a mobile communication device 130, according to various implementations of the invention. According to various implementations of the invention, mobile communication device 130 includes, for instance, a processor 302, a memory 304, a form space 306, a script space 308, and a device display 310. In some implementations, processor 302 may include one or more processors that cause device display 310 to receive and display promotional content 112. In some implementations, memory 304 stores promotional content 112 received from processing system 120. In some implementations, mobile communication device 130 includes a form space 306 that is used to render forms (such as graphical interface objects with which an operator of mobile communication device 130 may interact). In some implementations, mobile communication device 130 includes script space 308, which includes interpreters and/or compilers for executing scripting and/or executable instructions. Device display 310 may include various displays and interfaces common among mobile communication devices such as mobile cellular devices. For example, device display 310 may include a touch screen display, a liquid crystal display, an organic light emitting diode display, and other displays.

According to various implementations of the invention, device display 310 displays display object 312 (illustrated in FIG. 3 as display objects 312A, 312B, and 312N) and promotional display 320, which displays display content for different states of promotional content 112. Display object 312 includes text, graphics, and/or other objects that are displayed by an application or other process executing at mobile communication device 130.

In some implementations, promotional display 320 is displayed alongside display object 312 within the same graphical user interface. For example, device display 310 may display a website having various web content displayed as display object 312. Promotional display 320 may be displayed alongside the web content in the website. In another example, device display 310 may be displaying a gaming application having graphical objects displayed as display object 312. In this example, promotional display 320 may be placed within the gaming screen.

In some implementations, promotional display 320 is displayed apart from the graphical user interface that displays display object 312. For example, when display object 312 is part of a website displayed by device display 310 using a web browser, promotional display 320 may be displayed adjacent to but separate from the web browser/website.

In the foregoing examples, because the operator of mobile communication device 130 interacts with the website or gaming application in the foregoing examples using device display 320, accidental selection of promotional display 320 may be common and disrupt the operator's interaction with device display 310 using conventional promotional displays. By causing mobile communication device 130 to display and receive indications of interest in promotional content 112 according to different states (where one state may activate another state without indicating interest), more accurate indications of interest as well as less frequent interruptions to interactions with device display 310 may be achieved.

In some implementations, promotional display 320 occupies a predefined area within device display 310. In other words, promotional display 320 may have a fixed area within device display 310 that does not change when transitioning from one state of promotional content 112 to another state of promotional content 112. For example, promotional display 320 may have a shape such as a rectangle, square, or other shape that does not change (i.e., does not substantially change) when promotional content 112 transitions between states. In these implementations, an accidental selection of promotional display 320 by the operator of mobile communication device 130 does not change or otherwise alter the overall area in which promotional display 320 occupies within device display 310.

Figure 4:
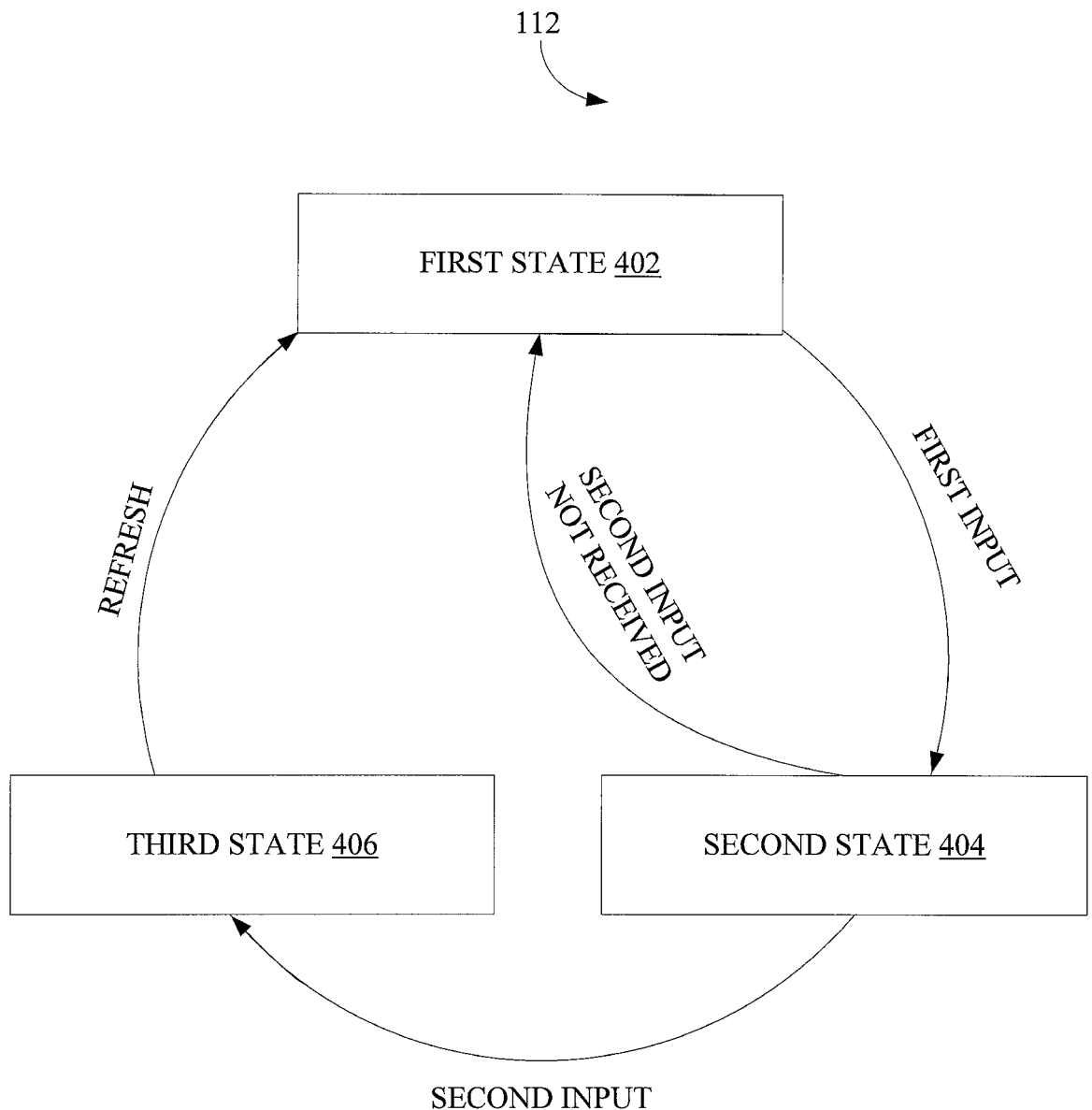
FIG. 4 is a state transition diagram illustrating different states of promotional content, according to various implementations of the invention.

FIG. 4 is a state transition diagram illustrating different states 402, 404, and 406 of promotional content 112, according to various implementations of the invention. In some implementations, first state 402 of promotional content 112 transitions to second state 404 when a first input related to promotional content 112 in first state 402 is received. For example, a user may click on promotional display 320 when the first portion of promotional content 112 is being displayed in first state 402.

In some implementations, when a second user input is received when promotional content 112 is in second state 404, promotional content 112 may transition to third state 406. For example, the user may click on a call-to-action button displayed while promotional content 112 is in second state 404. Third state 406 may include further actions such as causing a web browser to display a website of an advertiser, displaying a confirmation or cancel dialog, displaying a click-to-call input, displaying a click-to-buy input, displaying a send short message service message input, displaying a save coupon input, or otherwise performing an action related to the call-to-action. After one or more actions of third state 406 is performed (such as causing the advertiser website to open), promotional content 112 may refresh first state 402. In other words, promotional content 112 may revert to first state 402.

In some implementations, when a second user input related to second state 404 is not received, promotional content 112 may transition to first state 402. In some implementations, second user input related to second state 404 is "not received" when the second user input is not received within a predefined timeout period. In some implementations, second user input related to second state 404 is "not received" when an operator of mobile communication device 130 interacts with a graphical or other object of mobile communication device 130 that is unrelated to promotional content 112 in second state 404. For example, the operator may have accidentally clicked on promotional content 112 in first state 402, causing a transition to second state 404. In some implementations, the operator may simply ignore promotional content 112 in second state 404 until after the timeout period, thereby causing promotional content 112 to transition to first state 402 and causing no further interruption to processes at mobile communication device 130. In other implementations, the operator may continue other activities unrelated to promotional content 112 such as by clicking a form field in a web form unrelated to promotional content 112, which may then cause promotional content 112 to transition to first state 402.

FIGS. 5A, 5B, 5C, and 5D are block diagrams illustrating transition from one state of promotional content 112 to another state of promotional content 112, according to various implementations of the invention.

Figure 5A:
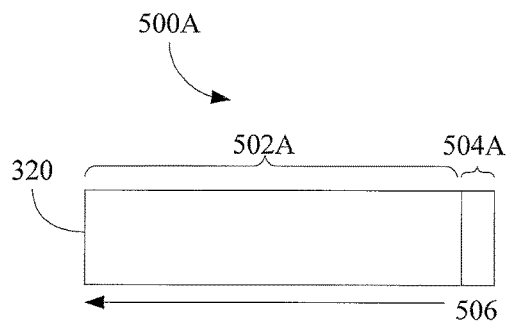
FIGS. 5A, 5B, 5C, and 5D are block diagrams illustrating a transition from one state of promotional content to another state of promotional content, according to various implementations of the invention.
Figure 5B:
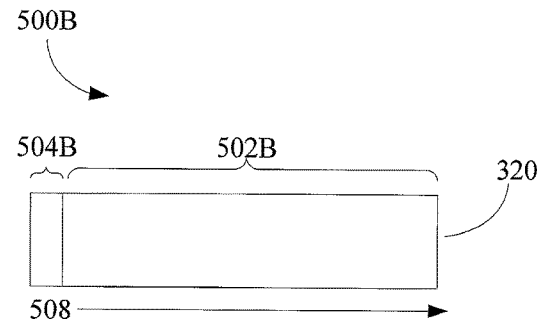

FIG. 5A illustrates promotional display 320 that displays promotional content 112 in a first state 500A, according to various implementations of the invention. In some implementations, promotional display 320 may include a body 502A that includes promotional content 112 (not illustrated in FIG. 5A), and a tab 504A. In some implementations, when a first input related to promotional content 112 in first state 500A is received, such as when a user clicks or otherwise selects any region within promotional display 302, tab 504A may slide in a direction illustrated by arrow 506, thereby resulting in second state 500B illustrated in FIG. 5B. Referring to FIG. 5B, promotional display 320 displays promotional content 112 in second state 500B in body 502B. In some implementations, portions of promotional content 112 displayed in body 502B may be different from portions of promotional content 112 displayed in body 502A. Thus, different portions of promotional content 112 may be displayed according to the state of promotional content 112. In some implementations, tab 504B may slide in a second direction illustrated by arrow 508 substantially opposite the direction illustrated by arrow 506, thereby resulting in first state 500A illustrated in FIG. 5A. In some implementations, as tab 504B slides in direction 508, the second portion becomes hidden as the first portion becomes visible.

Figure 5C:
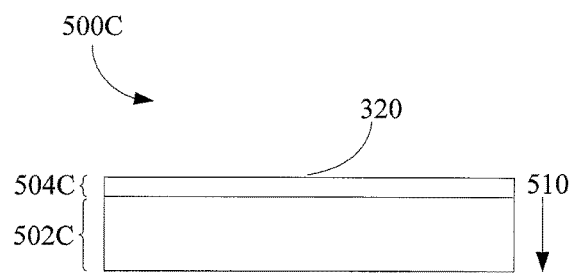
Figure 5D:
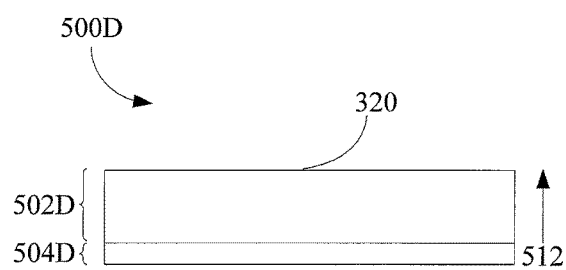

FIGS. 5C and 5D illustrate different orientations in which body 502 (illustrated in FIGS. 5C and 5D as body 502C and 502D, respectively) is positioned with respect to tab 504 FIGS. 5C and 5D as body 504C and 504D, respectively). In some implementations, when a first input related to promotional content 112 in first state 500C is received, such as when a user clicks or otherwise selects any region within promotional display 302, tab 504C may slide in a direction illustrated by arrow 510, thereby resulting in second state 500D illustrated in FIG. 5D. In some implementations, tab 504D may slide in a direction illustrated by arrow 512 substantially opposite the direction illustrated by arrow 510, thereby resulting in first state 500C illustrated in FIG. 5A.

The sliding actions described in the examples above are illustrative only. Various implementations not illustrated in FIGS. 5A, 5B, 5C, and 5D may be used as would be appreciated. In some implementations, multiple states of promotional content 112 revealed by multiple sliding actions may be displayed within promotional display 320. For example, multiple tabs 504 may each correspond to different states such that clicking on one state causes another state to appear by a sliding action of the corresponding tab 504. This process may continue until the multiple states are exhausted. Any one of the plurality of states may include a call-to-action or other action that indicates interest in promotional content 112. In some implementations, tab 504 may not be visibly displayed and is illustrated herein for purposes of explanation.

In some implementations, transition from one state to another state may include other actions such as fade-in/fade-out, instant transitions (i.e., substantially sudden transition with no intermediate effects), and/or other transition effects. In some implementations, first portions of promotional content 112 and second portions of promotional content 112 are displayed simultaneously, with first portions being selectable and second portions being non-selectable in the first state and the first portions being non-selectable and second portions being selectable in the second state. In these implementations, for example, a user clicking on the first portions when promotional content is in the first state activates the second portions so that the second portions become selectable and the first portions become non-selectable (even though both portions are simultaneously displayed in promotional display 320).

Figure 6A:
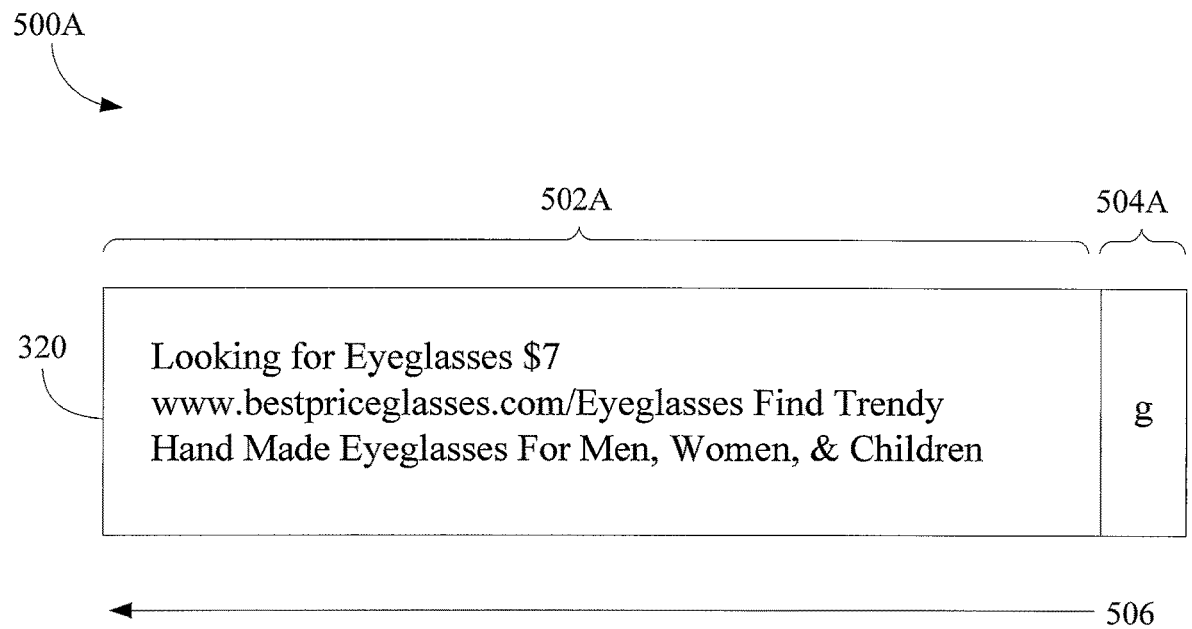
FIG. 6A is a block diagram illustrating promotional content in a first state, according to various implementations of the invention.

FIG. 6A is a block diagram illustrating promotional content 112 in first state 500A, according to various implementations of the invention. In some implementations, body 502A includes a first portion of promotional content 112 that includes content in text format (or other formats). In some implementations, the first portion is visible while the second portion (illustrated in FIG. 6B) is hidden. In some implementations, because first state 500A is typically the initial state of promotional content 112, the first portion includes scent of information that may perform different functions. In some implementations, the scent of information may draw an initial interest from a recipient such as an operator of mobile communication device 130 to continue with promotional content 112. In some implementations, the scent of information may include a description of promotional content 112 that describes "what is to come" if the first portion is selected. In the example illustrated by FIG. 6A, for example, the scent of information describes that by selecting promotional content 112, promotional display 320 will progress toward a goal of achieving "Eyeglasses $7." In some implementations, tab 504A may include a logo or other information (illustrated in FIG. 6A as the letter "g") that indicates a provider of promotional content 112 so that the recipient may trust or otherwise know the provider of promotional content 112. Here, "provider" does not indicate the advertiser or other marketer but rather the entity that stores and serves up promotional content 112 on behalf of the advertiser. In some implementations, as described above, promotional display 320 may transition from the first state to the second state by moving tab 504A in a direction indicated by arrow 506. In some implementations, as tab 504A slides along direction 506, the first portion becomes hidden as the second portion becomes visible.

In some implementations, the transition may occur without interrupting any process (such as an application) executing on mobile communication device 130. In some implementations, promotional content 112 and/or communication device 130 may include instructions that cause promotional content 112 to transition from one state to another state without otherwise altering processes at mobile communication device 130. For example, the instructions may include scripting instructions such as JAVASCRIPT, open standards of dynamic content such as HTML5 so that proprietary formats are unnecessary, proprietary formats used to animate graphics, and/or other instructions that can cause promotional content 112 to transition between states without otherwise altering processes at mobile communication device 130.

In these implementations, the first input, while causing the transition from the first state to the second state, may not affect other processes at mobile communication device 130. For example, a user operating mobile communication device 130 may be presented with promotional content 112 in the first state within an application such as an Internet browser. The user may accidentally select promotional content 112 in the first state, causing promotional content 112 to transition to the second state while not otherwise affecting the application. The user may ignore, not realize promotional content 112 was selected while in the first state, and/or otherwise not select promotional content 112 while in the second state. Because the transition from the first state to the second state may not affect other processes of mobile communication device 130, the user may continue interacting with the web application as if promotional content 112 was not accidentally selected. In this case, a determination of interest in promotional content 112 is not made.

Figure 6B:
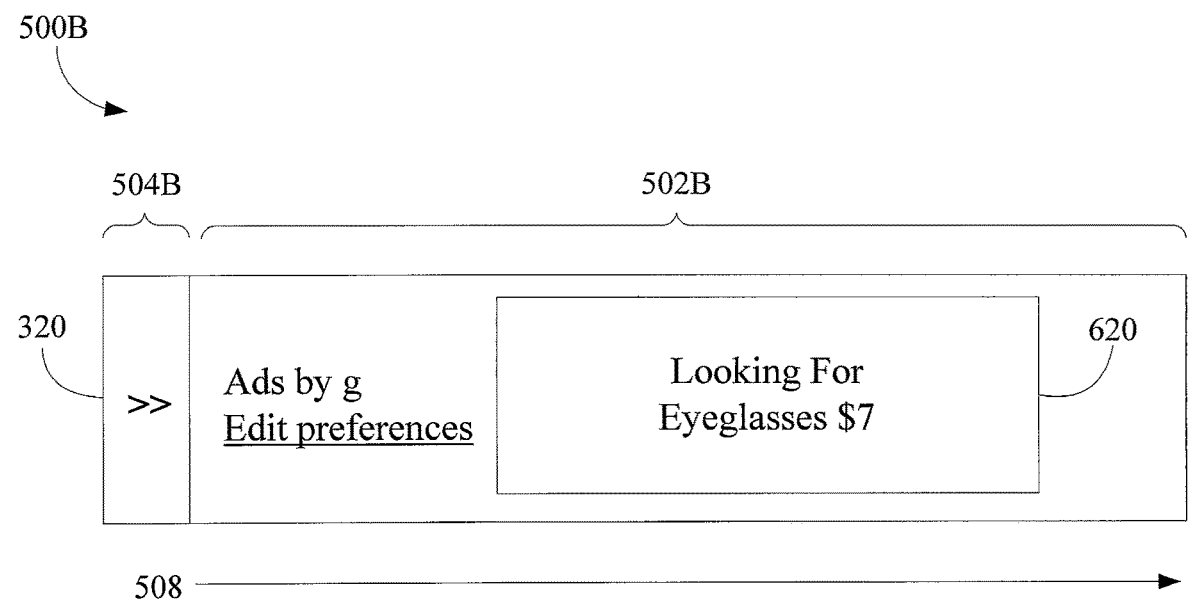
FIG. 6B is a block diagram illustrating promotional content in a second state, according to various implementations of the invention.

FIG. 6B is a block diagram illustrating promotional content 112 in a second state 500B, according to various implementations of the invention. In some implementations, body 502B includes a second portion of promotional content 112 that includes content in text format (or other formats).

In some implementations, the second portion is different from the first portion. In some implementations, body 502B displays second state 500B with information that identifies the provider of promotional content 112 (illustrated in FIG. 6B as the text "Ads by g"). In some implementations, body 502B includes an edit command that enables the recipient of promotional content 112 to edit preferences for promotional display 320 (illustrated in FIG. 6B as the link "Edit preferences"). The edit command when selected may cause a webpage or other user interface to be displayed. For example, the webpage may include, but is not limited to, a display of existing settings/preferences, a description of each setting/preference, and/or editable preferences that enable the recipient to adjust or otherwise input settings that control the behavior of promotional display 320 such as indicating types of transition effects, which types of promotional content 112 should be allowed, and/or edit other preferences. In some implementations, editable preferences may include security/privacy settings that may be used to disable location-based services, clear browsing (or click-through) histories, and/or other settings that may be edited to adjust security/privacy settings associated with promotional content 112.

In some implementations, body 502B may include a call-to-action button 620 or other interface object that causes a process or action to be performed in relation to promotional content 112. For example, selection of the call-to-action button 620 may cause a website for a discount eyeglass provider to be displayed.

Thus, in some implementations, instead of immediately causing the website for the discount eyeglass provider to be displayed, the recipient selects promotional content 112 while in first state 500A, causing the call-to-action button 620 to be displayed when promotional content 112 is in second state 500B, then selects the call-to-action button 620. In this manner, accidental selections of promotional content 112 while in first state 500A, for example, does not interfere with other operations and/or processes at mobile communication device 130.

In some implementations, tab 504B includes an indication (illustrated in FIG. 6B as the characters ">>") that second state 500B may be reverted to first state 500A. In these implementations, an operator of mobile communication device 130 may cause promotional display 320 to transition from second state 500B to first state 500A while tab 504B slides in a direction indicated by arrow 508.

In some implementations, content displayed in body 502B while promotional content 112 is in second state 500B may include at least a portion of promotional content 112 displayed while in first state 500A. In other words, first state 500A and second state 500B may both display the same portion of promotional content 112.

The examples illustrated in FIGS. 6A and 6B are illustrative only. First state 500A and second state 500B of promotional content 112 may each include other/alternative information as would be appreciated. For example, first state 500A and/or second state 500B may include buttons, graphics, or other objects associated with promotional content 112 not otherwise illustrated in FIGS. 6A and 6B.

Figure 7:
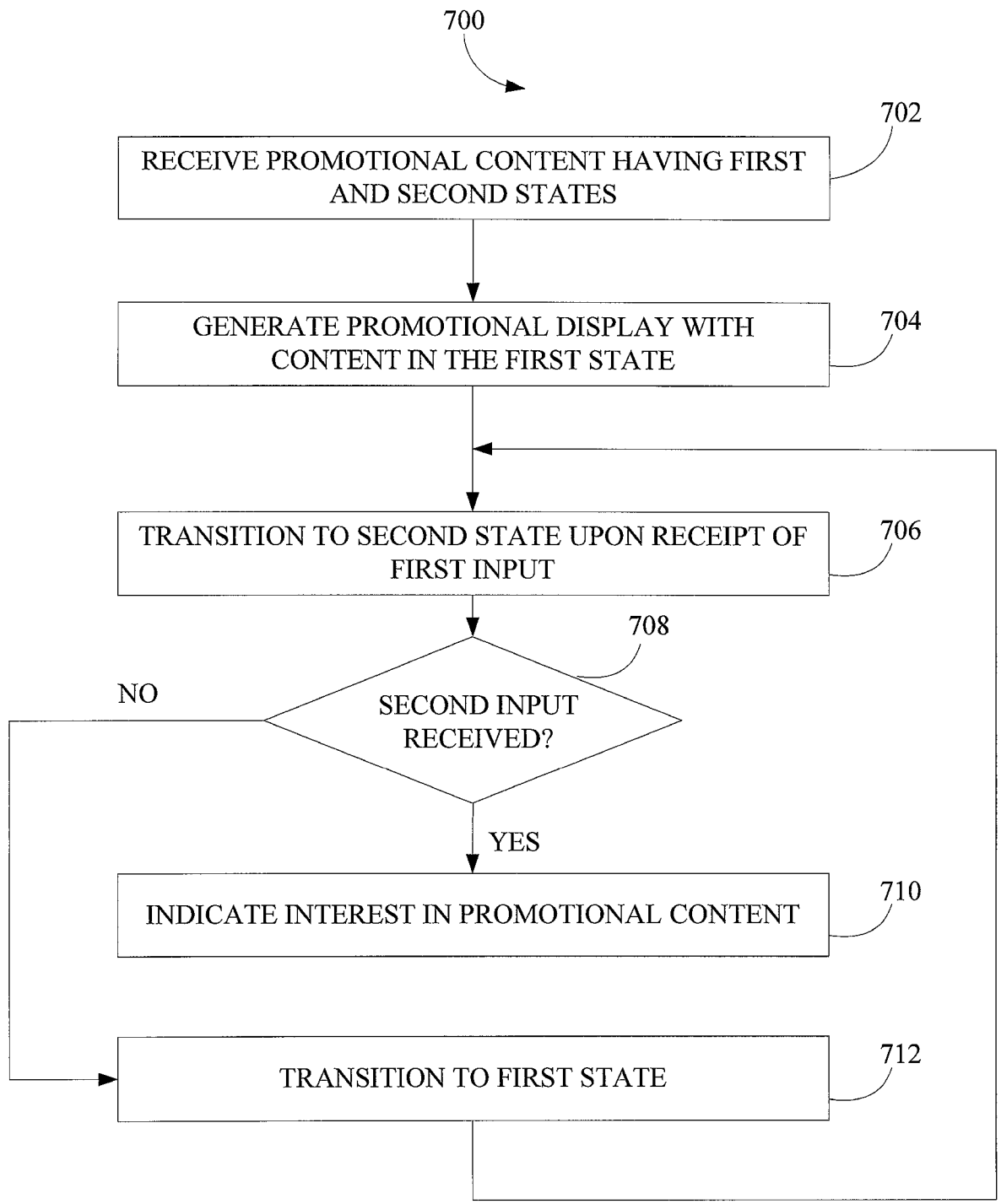
FIG. 7 is a process diagram illustrating a process for determining an interest in promotional content displayed at a mobile communication device, according to various implementations of the invention.

FIG. 7 is a process diagram illustrating a process 700 for determining an interest in promotional content displayed at a mobile communication device, according to various implementations of the invention. In some implementations, the example operations described below may be implemented at the mobile communication device such as mobile communication device 130 using instructions stored at and communicated from a remote device such as processing system 120 to the mobile communication device.

In an operation 702, promotional content (such as promotional content 112) may be received. The promotional content may include a first state and a second state. Depending on whether the promotional content is in the first state or the second state, different portions of the promotional content may be activated. In some implementations, while in the first state, the first portion of the promotional content may be visible while the second portion is hidden. In some implementations, the first portion and the second portion are each selectable only when visible.

In an operation 704, a promotional display (such as promotional display 320) that includes the received promotional content may be generated and displayed. In some implementations, the promotional display defaults or otherwise initially displays the promotional content in the first state.

In an operation 706, the promotional content may transition to the second state upon receipt of input from an operator of the mobile communication device in relation to the first state. For example, the operator may have clicked on promotional content while in the first state, causing the promotional content to be transitioned to the second state. In some implementations, the transition to the second state includes making the first portion hidden while making the second portion visible.

In an operation 708, if a second input from the operator in relation to the second state is received, then an interest in the promotional content may be indicated to the mobile communication device in an operation 710. For example, the mobile communication device may be informed that the operator is interested in the promotional content based on the received second input but not based on the first received input. In other words, in some implementations, the mobile communication device may determine that the operator is interested in the promotional content only when the operator has selected the promotional content at least twice (a first time when the promotional content is in the first state and a second time when the promotional content is in the second state). In some implementations, the interest may cause the mobile communication device to display further information related to the promotional content, such as causing a website of the advertiser or other marketer that created the promotional content to open. In some implementations, the interest may cause the mobile communication device to communicate the interest to a remove device such as processing system 120.

Returning to operation 708, if a second input from the operator in relation to the second state is not received, then processing may return to an operation 704, wherein the promotional content is displayed in the first state.

Figure 8:
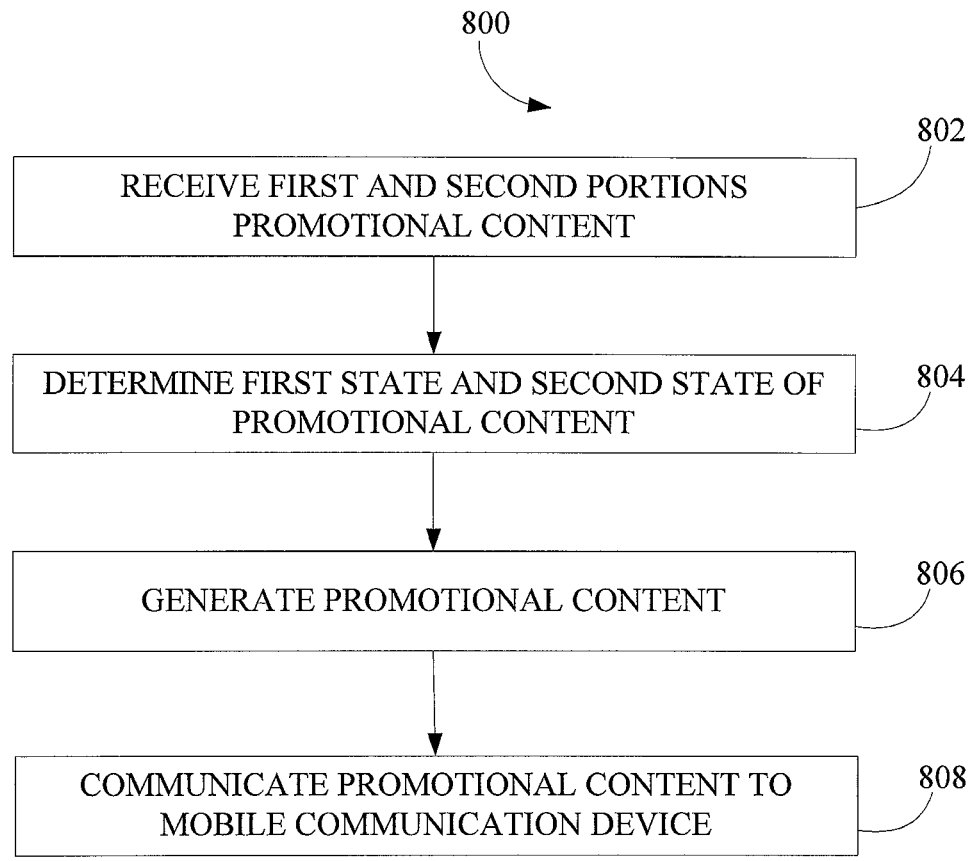
FIG. 8 is a process diagram illustrating a process for reducing false positive interest in promotional content displayed at a mobile communication device, according to various implementations of the invention.

FIG. 8 is a process diagram illustrating a process 800 for reducing false positive interest in promotional content displayed at a mobile communication device, according to various implementations of the invention.

In an operation 802, different portions of promotional content (such as first and second portions of promotional content 112) may be received. In an operation 804, a first state of promotional content and a second state of promotional content may be determined. In some implementations, the first and second states may be determined based on information input by a promoter such as an advertiser. In other words, the advertiser may specifically indicate the first portion and/or the second portion. In some implementations, the first and second portions are automatically determined based on analyzing the promotional content. According to various implementations of the invention, depending on whether the promotional content is in the first state or the second state, different portions of the promotional content may be activated. In some implementations, while in the first state, the first portion of the promotional content may be visible while the second portion is hidden. In some implementations, the first portion and the second portion are each selectable only when visible.

In some implementations, the promotional content may transition to the second state upon receipt of input from an operator of the mobile communication device in relation to the first state. For example, the operator may have clicked on promotional content while in the first state, causing the promotional content to be transitioned to the second state. In some implementations, the transition to the second state includes making the first portion hidden while making the second portion visible.

In an operation 806, promotional content that includes display content for the first portion of promotional content, display content for the second portion of promotional content, and a landing page link associated with the display content for the second portion may be generated. In some implementations, the display content for the first state may be displayed by default before the display content for the second state when rendered at a mobile communication device.

In some implementations, the promotional content may include transition instructions that cause an interest in the promotional content to be indicated upon receipt of a user input in relation to the second state.

In some implementations, the transition instructions may cause display content for the second state to transition back to display content for the first state when the user input in relation to the second state is not received.

In an operation 808, the promotional content may be communicated to the mobile communication device. The mobile communication device may display the promotional content via a promotional display of the mobile communication device.

Implementations of the invention may be made in hardware, firmware, software, or any suitable combination thereof. Implementations of the invention may also be implemented as instructions stored on a machine readable medium, which may be read and executed by one or more processors. A tangible machine-readable medium may include any tangible, non-transitory, mechanism for storing or transmitting information in a form readable by a machine (e.g., a computing device). For example, a tangible machine-readable storage medium may include read only memory, random access memory, magnetic disk storage media, optical storage media, flash memory devices, and other tangible storage media. Intangible machine-readable transmission media may include intangible forms of propagated signals, such as carrier waves, infrared signals, digital signals, and other intangible transmission media. Further, firmware, software, routines, or instructions may be described in the above disclosure in terms of specific exemplary implementations of the invention, and performing certain actions. However, it will be apparent that such descriptions are merely for convenience and that such actions in fact result from computing devices, processors, controllers, or other devices executing the firmware, software, routines, or instructions.

Implementations of the invention may be described as including a particular feature, structure, or characteristic, but every aspect or implementation may not necessarily include the particular feature, structure, or characteristic. Further, when a particular feature, structure, or characteristic is described in connection with an aspect or implementation, it will be understood that such feature, structure, or characteristic may be included in connection with other implementations, whether or not explicitly described. Thus, various changes and modifications may be made to the provided description without departing from the scope or spirit of the invention. As such, the specification and drawings should be regarded as exemplary only, and the scope of the invention to be determined solely by the appended claims.

What is claimed is:

1. A method, comprising:
receiving, by a device comprising one or more processors, a content package comprising content having at least three states, a first input object comprising a first image, a second input object comprising a second image;
displaying, by the device, the content in a first state, wherein the first state displays the first image of the first input object in a selectable state and the second image of the second input object in a non-selectable state;
detecting, by the device, a first interaction that causes the content to transition from the first state to a second state;
displaying, by the device, the content in the second state in response the first interaction, wherein the display of the content in the second state includes the first image of the first input object in the non-selectable state and the second image of the second input object in the selectable state;
detecting, by the device, a second interaction with the content in the second state, wherein the device is configured to transition the content to a third state in response to the second interaction; and
transitioning, by the device, the content to the third state in response to the second interaction, wherein the display of the content in the third state includes the first image of the first input object and the second image of the second input object in a non-visible state, and a video content item in a visible state.

2. The method of claim 1, wherein displaying the content in the second state further comprises displaying, by the device, a transition effect that indicates a change from the first state to the second state.

3. The method of claim 1, wherein displaying the content in the first state further comprises hiding, by the device, a second portion of the content corresponding to the second state.

4. The method of claim 1, wherein the content package includes a third image, and wherein transitioning the content to the third state further comprises displaying, by the device, the third image in addition to the video content item.

5. The method of claim 1, wherein displaying the content in the first state or displaying the content in the second state further comprises displaying, by the device, first text in a first region of an interface presented on the device; and
wherein transitioning the content to the third state further comprises displaying, by the device, second text in a second region of the interface presented on the device.

6. The method of claim 1, further comprising determining, by the device, that a predetermined timeout period has elapsed; and
wherein transitioning the content to the third state is responsive to determining that the predetermined timeout period has elapsed.

7. The method of claim 1, wherein displaying the content in the first state occupies the same space within a display of the device as when displaying the content in the second state.

8. A system, comprising:
a device comprising one or more processors coupled to memory, the device configured to:
receive a content package comprising content having at least three states, a first input object comprising a first image, a second input object comprising a second image;
display the content in a first state, wherein the first state displays the image of the first input object in a selectable state and the second image of the second input object in a non-selectable state;
detect a first interaction that causes the content to transition from the first state to a second state;
display the content in the second state in response the first interaction, wherein the display of the content in the second state includes the first image of the first input object in the non-selectable state and the second image of the second input object in the selectable state;
detect a second interaction with the content in the second state, wherein the device is configured to transition the content to a third state in response to the second interaction; and
transition the content to the third state in response to the second interaction, wherein the display of the content in the third state includes the first image of the first input object and the second image of the second input object in a non-visible state, and a video content item in a visible state.

9. The system of claim 8, wherein the device is further configured to display the content in the second state by displaying a transition effect that indicates a change from the first state to the second state.

10. The system of claim 8, wherein the device is further configured to display the content in the first state by hiding a second portion of the content corresponding to the second state.

11. The system of claim 8, wherein the content package includes a third image, and wherein the device is further configured to transition the content to the third state by displaying the third image in addition to the video content item.

12. The system of claim 8, wherein the device is further configured to display the content in the first state or display the content in the second state by displaying first text in a first region of an interface presented on the device; and
wherein the device is configured to transition the content to the third state by displaying second text in a second region of the interface presented on the device.

13. The system of claim 8, wherein the device is further configured to:
determine that a predetermined timeout period has elapsed; and
transition the content to the third state responsive to determining that the predetermined timeout period has elapsed.

14. The system of claim 8, wherein the device is further configured to display the content in the first state such that the content occupies the same space within a display of the device as when displaying the content in the second state.

15. A non-transitory computer-readable medium having instructions stored thereon, the instructions executable by a device comprising one or more processors, such that the instructions cause the device to perform operations comprising:

receiving a content package comprising content having at least three states, a first input object comprising a first image, a second input object comprising a second image;

displaying the content in a first state, wherein the first state displays the image of the first input object in a selectable state and the second image of the second input object in a non-selectable state;

detecting a first interaction that causes the content to transition from the first state to a second state;

displaying the content in the second state in response the first interaction, wherein the display of the content in the second state includes the first image of the first input object in the non-selectable state and the second image of the second input object in the selectable state;

detecting a second interaction with the content in the second state, wherein the device is configured to transition the content to a third state in response to the second interaction; and transitioning the content to the third state in response to the second interaction, wherein the display of the content in the third state includes the first image of the first input object and the second image of the second input object in a non-visible state, and a video content item in a visible state.

16. The non-transitory computer-readable medium of claim 15, wherein displaying the content in the second state further comprises displaying a transition effect that indicates a change from the first state to the second state.

17. The non-transitory computer-readable medium of claim 15, wherein displaying the content in the first state further comprises hiding a second portion of the content corresponding to the second state.

18. The non-transitory computer-readable medium of claim 15, wherein the content package includes a third image, and wherein transitioning the content to the third state further comprises displaying the third image in addition to the video content item.

19. The non-transitory computer-readable medium of claim 15, wherein displaying the content in the first state or displaying the content in the second state further comprises displaying first text in a first region of an interface presented on the device; and wherein transitioning the content to the third state further comprises displaying second text in a second region of the interface presented on the device.

20. The non-transitory computer-readable medium of claim 15, wherein the operations further comprise determining that a predetermined timeout period has elapsed; and wherein transitioning the content to the third state is responsive to determining that the predetermined timeout period has elapsed.

* * * * *